United States Patent [19]
Hatanaka et al.

[11] Patent Number: 5,418,938
[45] Date of Patent: May 23, 1995

[54] DATA MANAGEMENT SYSTEM HAVING CPUS TO EACH OTHER VIA DUAL-PORT MEMORY

[75] Inventors: Yumiko Hatanaka; Kazuhiko Hata, both of Yokohama, Japan

[73] Assignee: Fujitsu Limited, Kanagawa, Japan

[21] Appl. No.: 996,668

[22] Filed: Dec. 24, 1992

[30] Foreign Application Priority Data

Dec. 27, 1991 [JP] Japan ................... 3-346601

[51] Int. Cl.⁶ ............................................ G06F 11/34
[52] U.S. Cl. ..................... 395/575; 395/275; 395/425; 395/325
[58] Field of Search ............... 395/575, 425, 145, 275, 395/144, 147, 400, 325; 371/8.2, 9.1, 11.2, 11.3; 364/268.1, 268.5, 268.7, 268.9, 931.4, 927.98, 964.2, 243.4

[56] References Cited

U.S. PATENT DOCUMENTS

| 4,141,066 | 2/1979 | Keiles ................... 364/119 |
| 4,439,839 | 3/1984 | Kneib et al. .............. 364/900 |
| 4,641,238 | 2/1987 | Kneib ................... 364/200 |
| 4,989,181 | 1/1991 | Harada ................... 365/200 |
| 5,005,158 | 4/1991 | McClure et al. ............ 365/200 |
| 5,053,949 | 10/1991 | Allison et al. ........... 364/239.2 |
| 5,091,847 | 2/1992 | Herbermann .............. 395/575 |
| 5,129,063 | 7/1992 | Sainola et al. ............ 395/275 |
| 5,170,466 | 12/1992 | Rogan et al. ............. 395/145 |
| 5,202,972 | 4/1993 | Gusefski et al. ........... 395/425 |

FOREIGN PATENT DOCUMENTS

| 56-64588 | 6/1981 | Japan . |
| 58-103061 | 6/1983 | Japan . |
| 61-136156 | 6/1986 | Japan . |
| 62-105243 | 5/1987 | Japan . |
| 63-128464 | 6/1988 | Japan . |
| 64-88851 | 4/1989 | Japan . |
| 2-21376 | 1/1990 | Japan . |
| 2-82325 | 3/1990 | Japan . |
| 2-238529 | 9/1990 | Japan . |
| 3-71364 | 3/1991 | Japan . |

Primary Examiner—Robert W. Beausoliel, Jr.
Assistant Examiner—Dieu-Minh Le

[57] ABSTRACT

A data management system includes a first processing unit, a second processing unit operating independently of the first processing unit, a dual-port memory connected between the first processing unit and the second processing unit and used to transfer data between the first processing unit and the second processing unit, a first data holding unit for storing data used for processing in the first processing unit, and a second data holding unit for storing data used for processing in the second processing unit. The data stored in one of the first and second data holding units is transferred to the other one of the first and second data holding units via the dual-port memory when a failure occurs in one of the first and second processing units is eliminated, so that the first and second holding units store identical data.

18 Claims, 15 Drawing Sheets

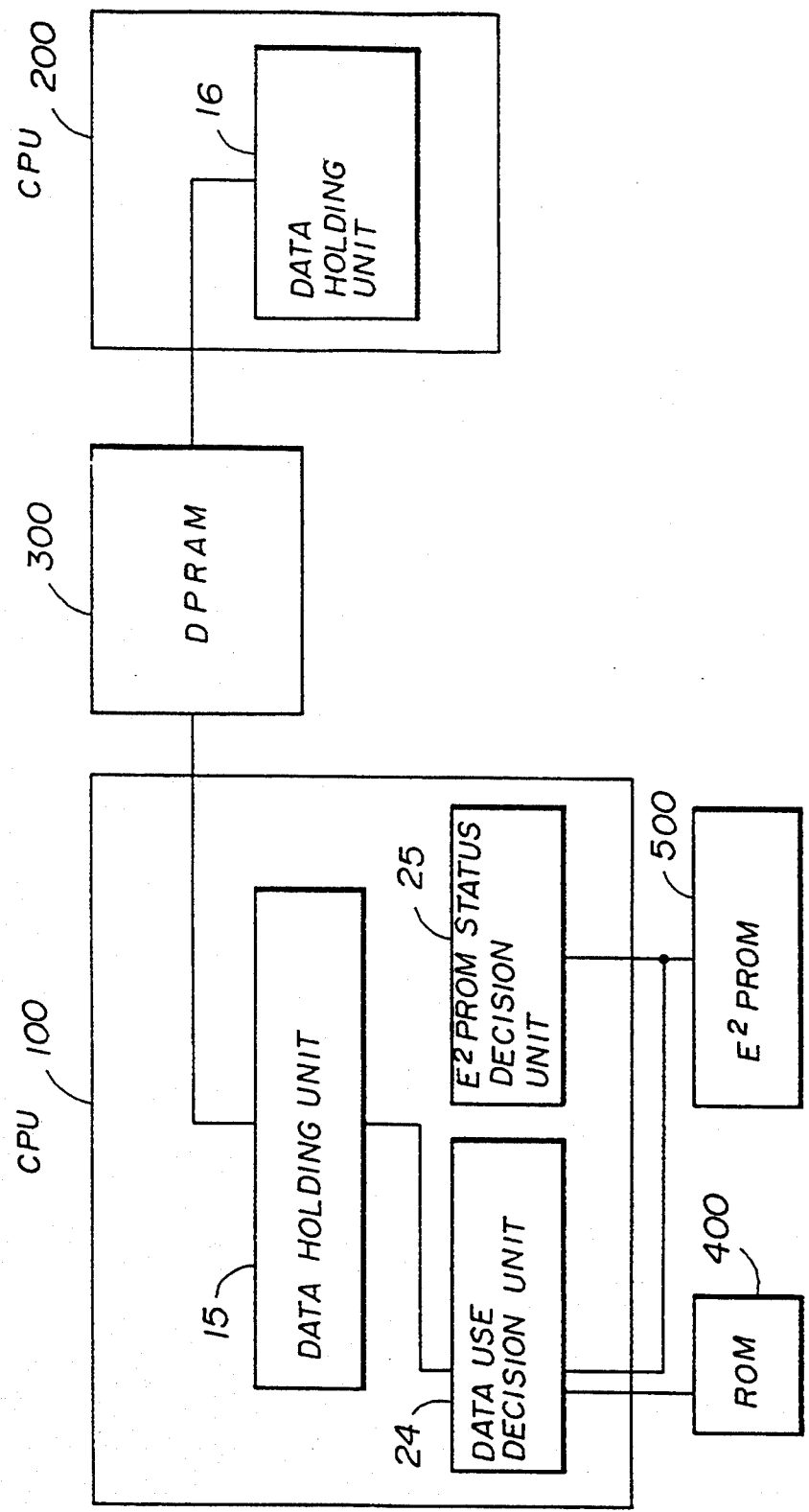

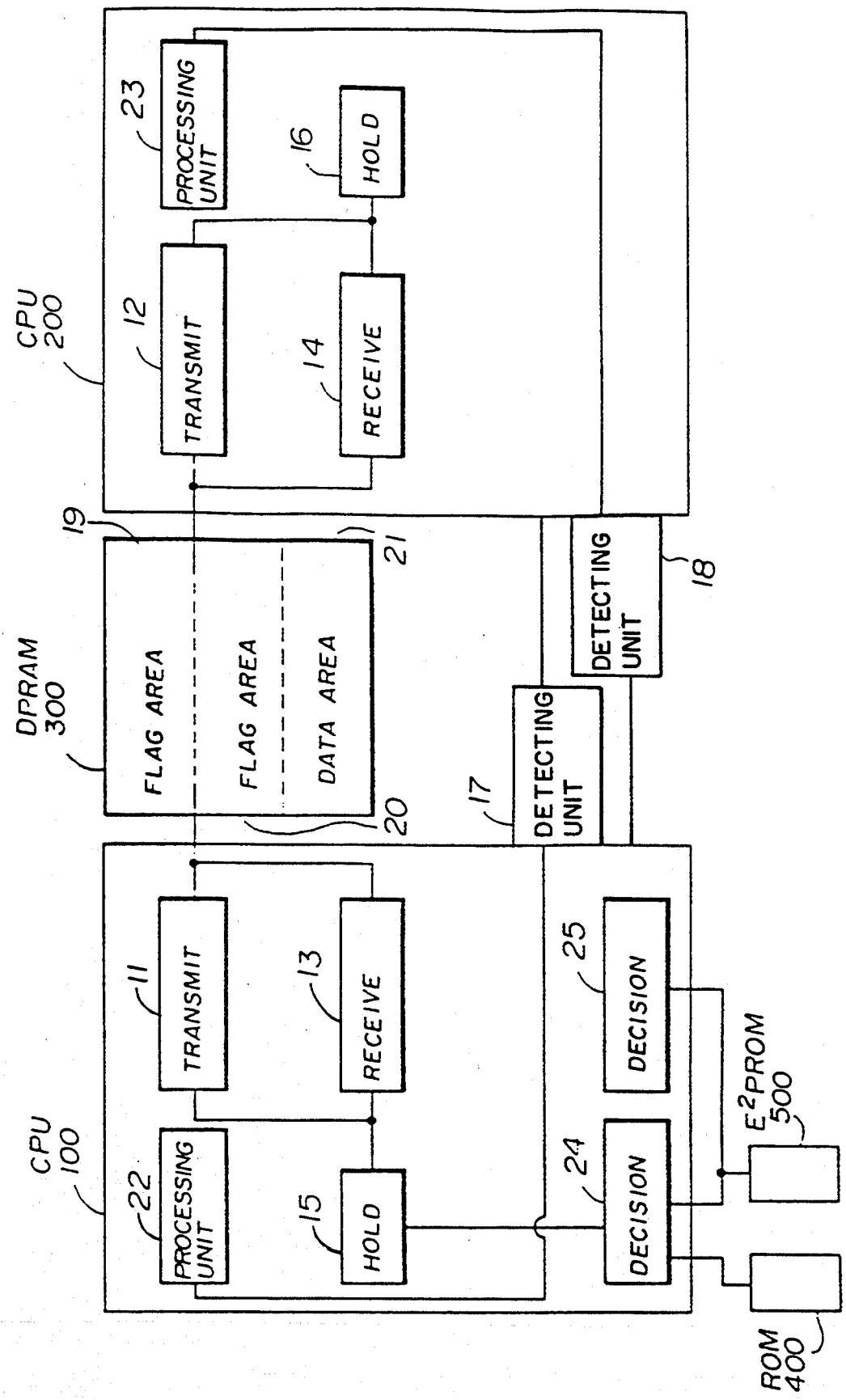

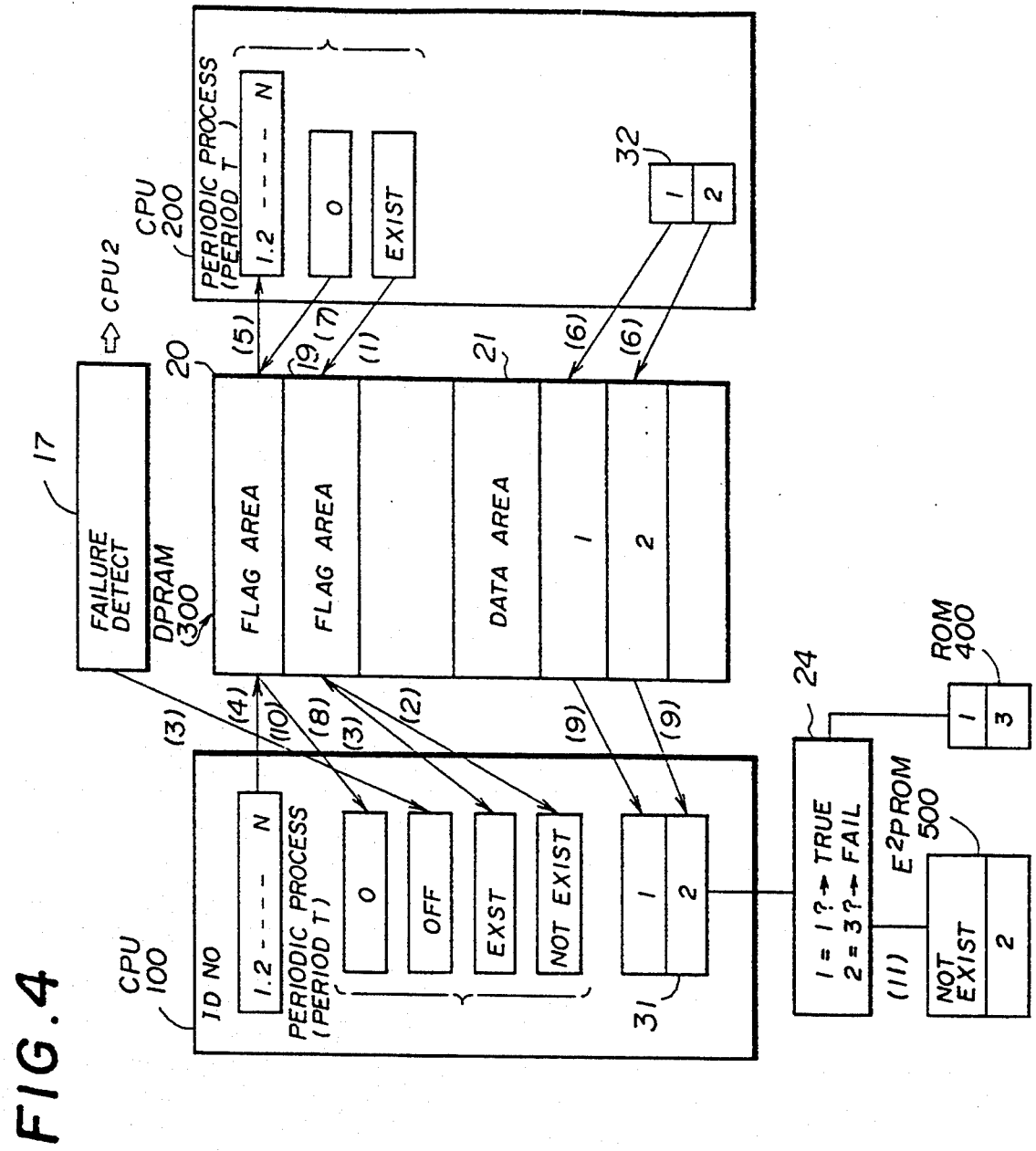

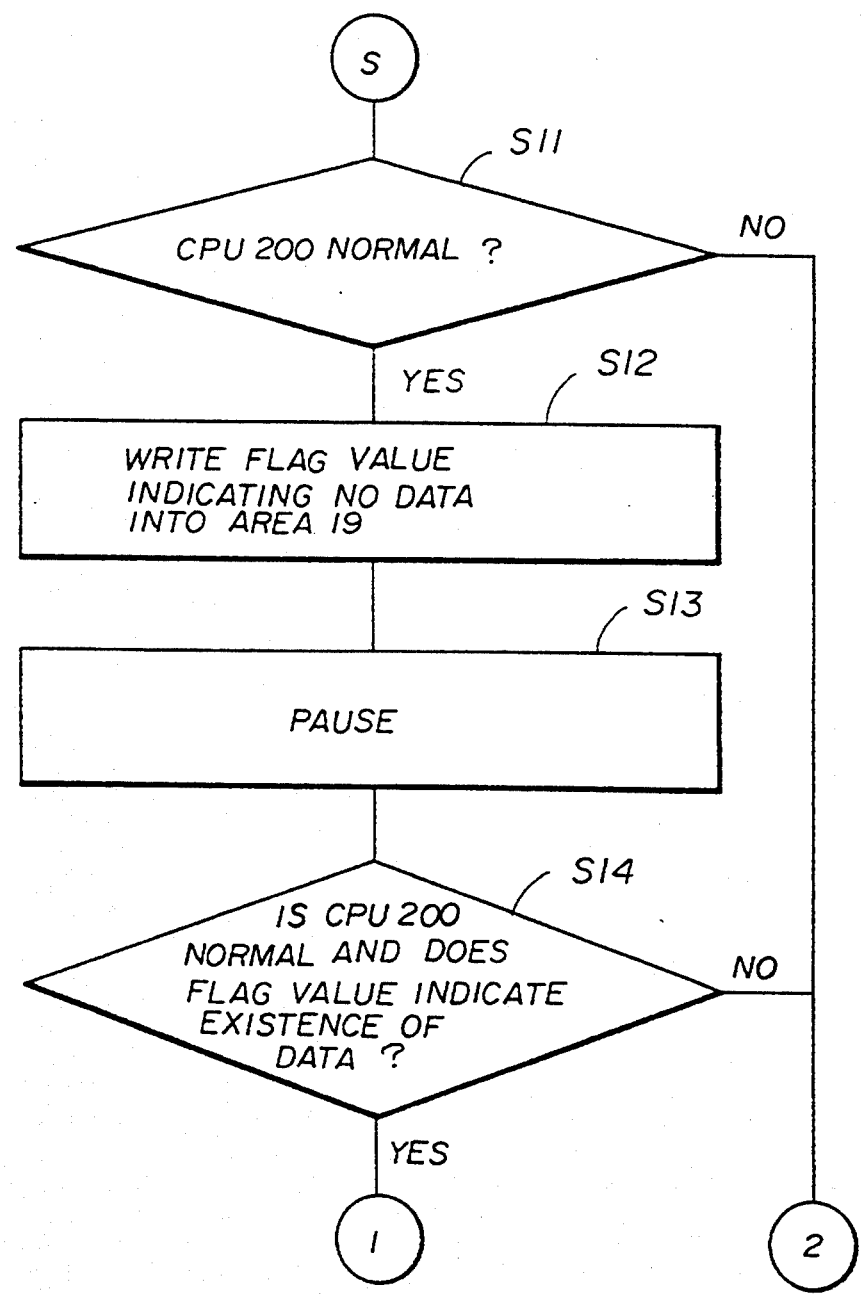

FIG. IOB
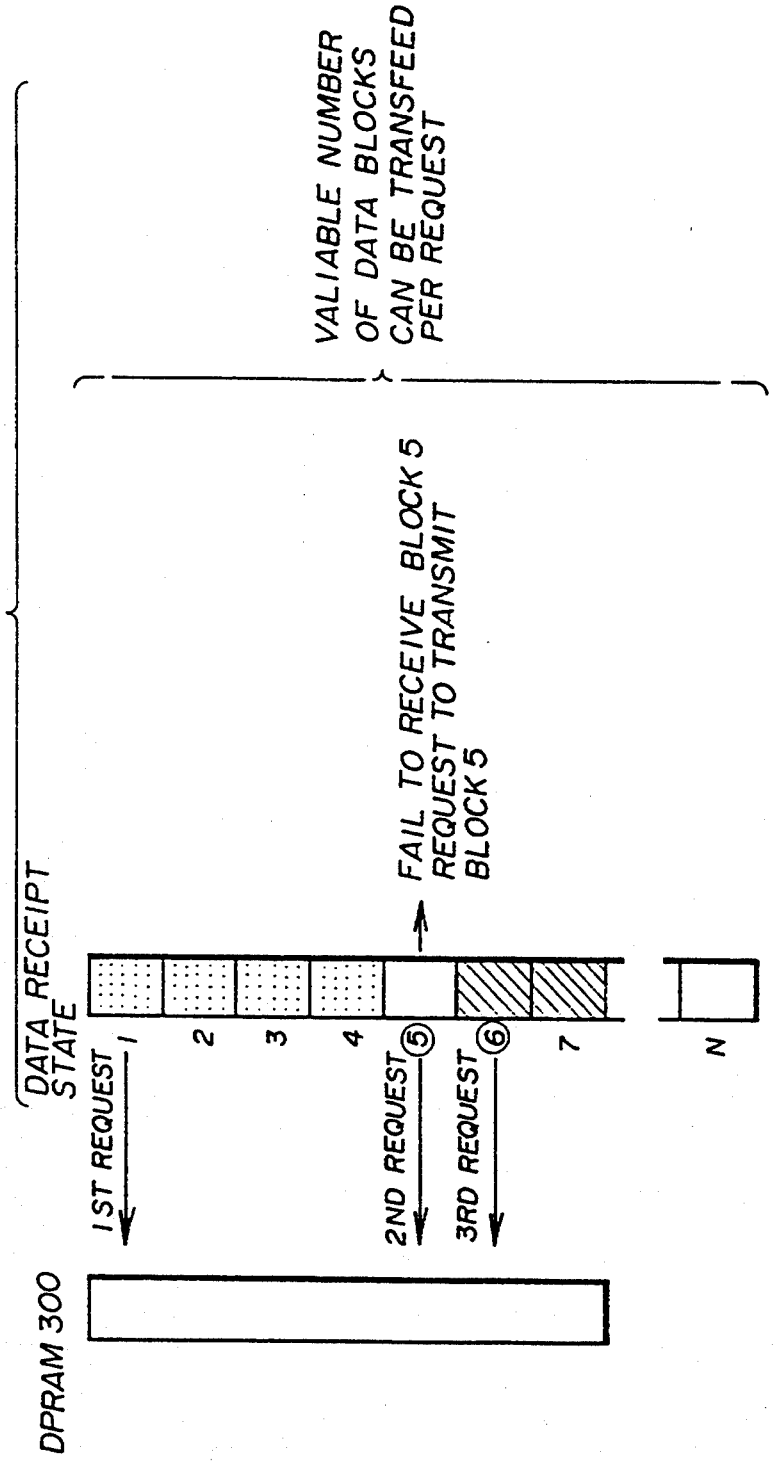

DATA MANAGEMENT SYSTEM HAVING CPUS TO EACH OTHER VIA DUAL-PORT MEMORY

BACKGROUND OF THE INVENTION

1. Field of the Invention

The present invention generally relates to a data management system having two CPUs coupled to each other via a dual-port memory, and more particularly to a data management system in which the two CPUs operate independently and data is transferred between the two CPUs via the dual-port memory.

2. Description of the Prior Art

Recently, it has been required that data management systems handle a large amount of data at high speeds. For example, supervisory devices or control devices provided in data transmission devices in an optical communications system handle a large amount of data at high speeds in order to supervise internal circuits of the data transmission devices and notify a host device of a failure which has occurred in the system. Recently, a data management system having a plurality of CPUs (microcomputers) has been proposed, in which one of the CPUs manages the other CPUs which performs decentralized functions.

In such a data management system, data, such as data necessary to provide the functions (used in processing in the CPUs 1 and 2), is transferred between the CPUs in order to realize various functions of the data management system. If a failure has occurred in one of the CPUs, the other CPUs cannot communicate with the defective CPU. When the failure has been eliminated, the communications with the previously defective CPU are started. At this time, there is a possibility that data handled by the recovered CPU may be inconsistent with data handled by the other CPUs. Hence, it is required that the recovered CPU recovers correct data without affecting the other CPUs and again provide the functions of the data management system by cooperating with the other CPUs.

FIG. 1 is a conventional data management system, which includes two CPUs 1 and 2, a dual-port random access memory (DPRAM) 3, a read only memory (ROM) 4, and an electrically erasable programmable ROM ($E^2$PROM) 5. The dual-port RAM 3 is provided between the CPU 1 and the CPU 2. The ROM 4, which is connected to the CPU 1, stores data used to initialize the CPUs 1 and 2. The $E^2$PROM 5 provides a backup memory area used to save data.

The CPU 1 and the CPU 2 have respective databases having the same contents. One of the CPUs 1 and 2 executes an operation on data processed by the other CPU. Data is transferred between the CPUs 1 and 2 via the dual-port RAM 3. The CPUs 1 and 2 are initialized on the basis of the data stored in the ROM 4 at the commencement of the operations of the CPUs 1 and 2. While the system is normally operating, data handled in the system is saved in the $E^2$PROM 5. When a failure which has occurred in either the CPU 1 or the CPU 2 is eliminated, the backup data saved in the $E^2$PROM 5 is used.

For example, the CPU 1 is provided in a host device, and the CPU 2 is provided in a communications device. Data being considered is related to, for example, the supervising of the communications device. More specifically, the data indicates what should be supervised and what results of the supervising should be transferred to the host device.

The CPU 1 unconditionally saves all data in the $E^2$PROM 5 for backup. Hence, it takes a long time to write data into the $E^2$PROM 5 under the control of the CPU 1. There is a possibility that the CPU 1 is writing data into the $E^2$PROM 5 even when the CPU 2 is ready to handle data. Hence, the entire operation of the data management system cannot be performed until the CPU 1 completes the writing of data into the $E^2$PROM 5. Even if a failure has been immediately recovered from, the system cannot restart until the completion of writing data into the $E^2$PROM 5 under the control of the CPU 1.

If failures which have occurred in the both CPUs 1 and 2 are eliminated, the CPUs 1 and 2 unconditionally restart on the basis of the data stored in the ROM 4. Hence, data handled after the CPUs 1 and 2 restart may be inconsistent with data handled before the failures occurred. In this case, the data management system may malfunction.

SUMMARY OF THE INVENTION

It is a general object of the present invention to provide a data management system in which the above disadvantages are eliminated.

A more specific object of the present invention is to provide a data management system capable of saving data in a backup memory at high speeds and restarting, immediately after a failure is eliminated, to operate with data identical to the data being processed when the failure occurred.

The above objects of the present invention are achieved by a data management system comprising: a first processing unit; a second processing unit operating independently of the first processing unit; a dual-port memory connected between the first processing unit and the second processing unit and used to transfer data between the first processing unit and the second processing unit; first data holding means, related to the first processing unit, for storing data used for processing in the first processing unit; second data holding means, related to the second processing unit, for storing data used for processing in the second processing unit; and control means, coupled to the first and second processing units, the dual-port memory and the first and second data holding means, for transferring the data stored in one of the first and second data holding means to the other one of the first and second data holding means via the dual-port memory when a failure occurs in one of the first and second processing units and is eliminated, so that the first and second holding means store identical data.

BRIEF DESCRIPTION OF THE DRAWINGS

Other objects, features and advantages of the present invention will become more apparent from the following detailed description when read in conjunction with the accompanying drawings, in which:

FIG. 2 is a block diagram of an embodiment of the present invention;

FIG. 3 is a block diagram of the embodiment of the present invention in more detail;

FIG. 4 is a block, diagram showing the operation of the embodiment of the present invention;

FIGS. 5A and 5B are flowcharts showing the operation of a first CPU used in the embodiment of the present invention;

FIG. 10A and 10B are diagrams showing the operation of the embodiment of the present invention;

DESCRIPTION OF THE PREFERRED EMBODIMENT

Figure 1:
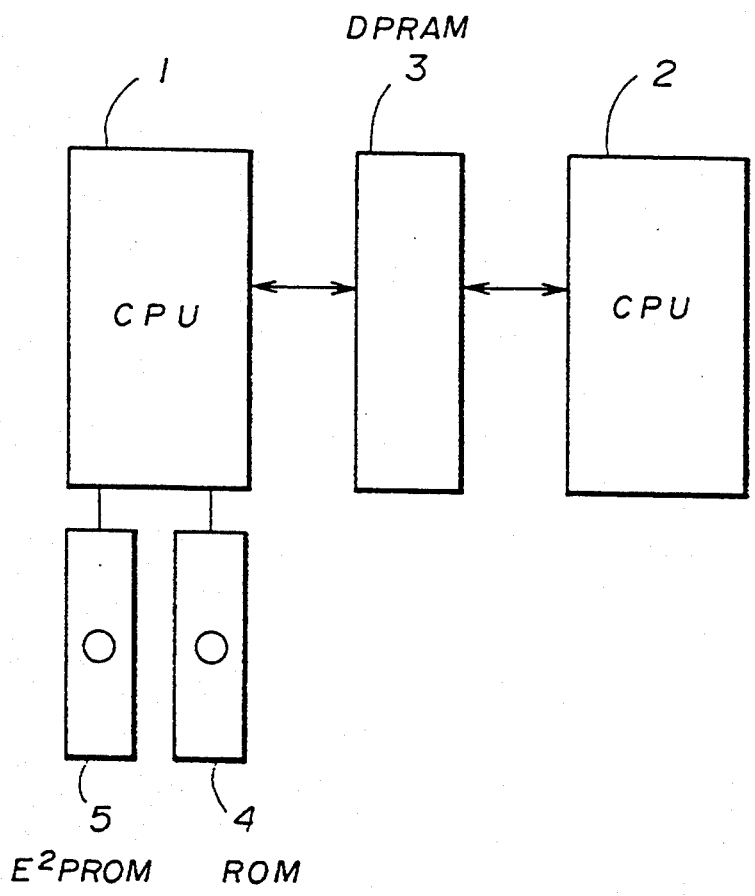
FIG. 1 is a block diagram of a conventional data management system having a plurality of CPUs.

A description will now be given of an embodiment of the present invention. Referring to FIG. 2, a data management system according to the embodiment of the present invention comprises two CPUs (microprocessors) 100 and 200, a dual-port RAM 300, a ROM 400 and an E$^2$PROM 500. The ROM 400 and the E$^2$PROM 500 correspond to the ROM 4 and the E$^2$PROM 5. The CPUs 100 and 200 operate independently of each other, and transfer data between each other via the dual-port RAM (hereinafter simply referred to as a DPRAM) 300. The CPU 100 includes a data holding unit 15, a data use decision unit 24, and an E$^2$PROM status decision unit 25. The CPU 200 includes a data holding unit 16. One of the CPUs 100 and 200 executes an operation on data processed by the other CPU. The contents of the data holding units 15 and 16, which are, for example, data used in processing in the CPUs 100 and 200, are respectively updated on the basis of the result of the above operation. For this purpose, the CPUs 100 and 200 communicate with each other via the DPRAM 300. The CPU 100 has the function of detecting a failure which occurs in the CPU 200, and the CPU 200 has the function of detecting a failure which occurs in the CPU 100. For example, when the CPUs 100 and 200 respectively detect failures which have occurred in the CPUs 200 and 100 and either the CPU 100 or the CPU 200 (for example, the CPU 100) has recovered, the CPU 200 reads the contents of the data holding unit 16 and sends them to the CPU 100 via the DPRAM 300. The CPU 100 stores the received contents of the data holding unit 16 in the data holding unit 15. In this manner, the CPUS 100 and 200 are made to have the same data.

According to another aspect of the present embodiment of the present invention, the E$^2$PROM status decision unit 25 determines whether the ROM 400 or the E$^2$PROM 500 should be used to provide data used to restart the system, when both the CPUs 100 and 200 are made to recover from the defective states. When the E$^2$PROM decision unit 25 determines that there is backup data in the E$^2$PROM 500 and the backup data is correct, the decision unit 25 selects the E$^2$PROM 500. In other cases, the E$^2$PROM decision unit 25 selects the ROM 400. For example, the E$^2$PROM decision unit 500 makes the above decision on the basis of data indicating the number of times that data has been repeatedly written into the E$^2$PROM 500, preamble data indicating whether the status of the E$^2$PROM 500 is normal or abnormal, and BCC (Block Check Character) code data indicating whether the number of pieces of data in the E$^2$PROM 500 is normal or abnormal.

According to yet another aspect of the embodiment of the present invention, the data use decision unit 24 provided in the CPU 100 determines whether or not the data stored in the ROM 400 coincides with the data stored in the data holding unit 15. The decision unit 24 saves the data in the data holding unit 15 in the E$^2$PROM 500 when the result of the above determination is negative.

FIG. 3 shows the structure of the embodiment in more detail. As shown in FIG. 3, the CPU 100 comprises, in addition to the structural elements shown in FIG. 2, a data transmitting unit 11, a data receiving unit 13, and a DPRAM processing unit 22. The CPU 200 comprises, in addition to the data holding unit 16 shown in FIG. 2, a data transmitting unit 12, a data receiving unit 14, and a DPRAM processing unit 23. The data transmitting unit 11 transmits data stored in the data holding unit 15 to the DPRAM 300. The data receiving unit 13 receives data from the DPRAM 300 and stores it in the data holding unit 15. The data sending unit 12 of the CPU 200 sends data in the data holding unit 16 to the DPRAM 300. The data receiving unit 14 receives data from the DPRAM 300 and stores it in the data holding unit 16. The operations of the data sending unit 11 and the data receiving unit 13 are controlled by the DPRAM processing unit 22 of the CPU 100. Further, the CPUs 100 and 200 respectively have failure detecting units 17 and 18, which detect failures that have occurred in the CPUs 200 and 100, respectively. The failure detecting units 17 and 18 are formed in, for example, I/O areas of the CPUs 100 and 200.

The DPRAM 300 includes a data existence/nonexistence flag area 19, a data transfer request flag area 20, and a data area 21. The flag area 19 has flags used to control a communications procedure. The flag area 20 has a flag requesting transfer of data to a remote CPU. The data area 21 stores data transferred between the CPUs 100 and 200. The DPRAM controllers 22 and 23 periodically monitors the flag areas 19 and 20, and activate the corresponding data transmitting units and receiving units in accordance with the values of the flags. Then, data is transferred between the CPUs 100 and 200.

The ROM 400 stores default data used to initialize the CPUS 100 and 200. The E$^2$PROM 500 stores data handled in the system in order to save backup data. The ROM 400 and the E$^2$PROM 500 are connected to the data use decision unit 24 provided in the CPU 100. The data use decision unit 24 determines whether or not data received from the CPU 200 should be stored in the E$^2$PROM 500. More particularly, the decision unit 24 compares the default data stored in the ROM 400 with the data received from the CPU 200, and stores the data stored in the data holding unit 15 only when the received data is different from the default data.

The CPU 100 also includes the E$^2$PROM status decision unit 25, which determines whether the ROM 400 or the E$^2$PROM 500 should be used to recover data when a failure is eliminated. When the decision unit 25 determines that data can be recovered from the E$^2$PROM 500, the data is read from the E$^2$PROM 500 and transferred to the data holding unit 15. When the decision unit 25 determines that recovery of data should be carried out from the data stored in the ROM 400, the data is read from the ROM 400 and transferred to the data holding unit 15.

The DPRAM processing unit 22 has the functions of not only controlling the DPRAM 21 but also controlling the entire operation of the CPU 100. Similarly, the DPRAM processing unit 23 has the functions of not only controlling the DPRAM 21 but also controlling the entire operation of the CPU 200.

A description will now be given of the operation of the procedure that is executed when a failure occurs in the CPU 100 and then the failure is eliminated. When a failure has occurred in the CPU 100, the CPU 100 notifies the failure detecting unit 18 of the occurrence of the failure. The failure detecting unit 18, which periodically monitors the CPU 100, receives the above notification from the CPU 100, and starts to periodically detect a failure recovery notification from the CPU 100. This is because data stored in the data holding unit 16 of the CPU 200 should be sent to the CPU 100 after the CPU 100 has recovered. In response to receipt of the failure recovery notification from the CPU 100, the failure detecting unit 18 activates the DPRAM processing unit 23 in the CPU 200.

The CPU 100 restarts, and then writes a flag "1" (indicating that the CPU 200 does not have data) into the data existence/non-existence flag area 19 in order to confirm whether the CPU 200 has data necessary for operation.

The DPRAM processing unit 23 periodically operates, and monitors the data existence/non-existence flag area 19 in the DPRAM 300 via a signal line coupling the unit 23 and the DPRAM 300. Normally, a flag "0" (indicating that the CPU 200 has data) is stored in the flag area 19. Since the CPU 100 sets the flag to "1", the DPRAM processing unit 23 detects that the flag in the area 19 has been changed from "0" to "1". In this case, the DPRAM processing unit 23 changes the flag in the flag area 19 from "1" to "0".

The DPRAM processing unit 22 of the CPU 100 detects that the flag in the flag area 19 has been changed from "1" to "0" by the CPU 200 although the CPU 100 previously set the flag to "1". In this manner, the CPU 100 determines that the CPU 200 is normally operating and data exists in the CPU 200. Then, in order to receive data from the CPU 200, the DPRAM processing unit 22 writes a flag value (a data identification number indicating a block of data) into the data transfer request flag area 20. In the embodiment being considered, data is managed in block. It is possible to write a plurality of flag values (data identification numbers) into the flag area 20.

The DPRAM processing unit 23 periodically monitors the data transfer request flag area 20. When the DPRAM processing unit 23 detects the identification number in the area 20, the data block specified by the data identification number is read from the data holding unit 16 and transferred to the data area 21 via the data transmitting unit 12 under the control of the DPRAM processing unit 23. Then, the unit 23 clears the transfer request (data identification number) written by the DPRAM processing unit 22 of the CPU 100.

The unit 22 starts to periodically monitor the data identification number written into the area 20 after writing it into the area 20. When the unit 22 detects that the data identification number has been cleared by the unit 23 in the CPU 200, the CPU 100 starts to read the requested data block specified by the data identification number from the data area 21 via the data receiving unit 13, and writes it into the data holding unit 15.

In the above-mentioned manner, data is transferred from the CPU 200 to the CPU 100. Hence, the CPU 100 has data, and sets the flag in the flag area 19 to "0" indicating that there is data in the CPU 100.

The processing unit 22 of the CPU 100 activates the data use decision unit 24 in order to determine whether or not the received data should be saved as backup data. The data use decision unit 24 reads the received data from the data holding unit 15 and the corresponding default data from the ROM 400, and determines whether or not the data from the unit 15 coincides with the corresponding data from the ROM 400. When the result of the above determination is negative, the data is saved in the backup $E^2PROM$ 500 under the control of the decision unit 24.

In the above-mentioned manner, data can be recovered from the CPU 200 after the CPU 100 has recovered.

A description will now be given of an operation of the system executed when a failure occurs in the CPU 200 and the failure is eliminated. When a failure has occurred in the CPU 200, the CPU 200 notifies the failure detecting unit 17 of the CPU 100 of the occurrence of the failure. The failure detecting unit 17, which periodically monitors the CPU 200, receives the above notification from the CPU 200, and starts to periodically check for a failure recovery notification from the CPU 200. This is because data stored in the data holding unit 15 of the CPU 100 needs to be sent to the CPU 200 after the CPU 200 has recovered. In response to receipt of the failure recovery notification from the CPU 200, the failure detecting unit 17 activates the DPRAM processing unit 22 in the CPU 100.

The processing unit 22 writes the flag value "1" into the flag area 19 as in the previously described case where the processing unit 23 writes the flag value into the flag area 19. The DPRAM 23 of the CPU 200 does not change the flag from "1" to "0", and writes a data identification number (flag value), indicating a data block requested to be transferred, into the data transfer request flag area 20.

The processing unit 22 of the CPU 100 detects that the flag value in the flag area 19 is not changed by the CPU 200 and determines that the CPU 200 needs data for recovery. Then, the processing unit 22 refers to the flag area 20 and determines which data block should be transferred to the CPU 200. Then, the requested data is read from the data holding unit 15 and is transferred to the data area 21 via the data transmitting unit 11. After completing transfer of the requested data, the processing unit 22 clears the data identification number in the flag area 20. Then, the data is read from the data area 21 and transferred to the data holding unit 16 via the data receiving unit 14 under the control of the processing unit 23.

In the above-mentioned manner, data can be recovered in the CPU 200. Then, the processing unit 23 writes the flag value "0" (indicating that the CPU 200 has data) into the flag area 19.

A description will now be given of an operation of the system executed when failures concurrently occur in both the CPUs 100 and 200 (by power down, for example) and are concurrently eliminated (by, for example, power ON). In this case, there is a high possibility that data stored in the data holding units 15 and 16 has errors. Hence, it is necessary to install the backup data or the default data in both the data holding units 15 and 16.

The E²PROM status decision unit 25 in the CPU 100 determines whether data should be read from the ROM 400 or the E²PROM 500. In the case where the processing unit 22 of the CPU 100 confirms that there is also no data in the CPU 200 when the CPU 100 restarts, the processing unit 22 activates the E²PROM status decision unit 25. The decision unit 25 determines whether or not there is backup data in the E²PROM 500. When the result of this determination is affirmative, the decision unit 25 determines whether or not the backup data is correct. When the result of this determination is also affirmative, the backup data is read from the E²PROM 500 and written into the data holding unit under the control of the decision unit 25. When it is determined that there is no backup data in the E²PROM 500 or there is only defective backup data therein, the default data is read from the ROM 400 and written into the data holding unit 15.

The processing unit 22 of the CPU 100 sets, in the flag area 20, the data identification number indicating the data block to be transferred when completing the writing of data into the data area 21. The processing unit 23 of the CPU 200 reads the data from the data area 21 as in the previously described case where the CPU 100 has recovered, and writes the readout data into the data holding unit 16 via the data receiving unit 14. After completing the writing of the readout data, the processing unit 23 clears the data identification number in the flag area 20. Meanwhile, the CPU 100 continues to transmit data blocks while changing the data identification numbers. In the above-mentioned manner, the data held in the data holding units 15 and 16 before the failures occurred can be recovered.

A more detailed description will now be given of the embodiment of the present invention.

FIG. 4 shows the system structure of the embodiment of the present invention. In FIG. 4, parts that are the same as parts shown in FIG. 3 are given the same reference numbers as previously. The CPU 100 includes a database 31, and the CPU 200 includes a database 32. The databases 31 and 32 correspond to the data holding units 15 and 16 shown in FIG. 3, respectively.

Figure 5B:
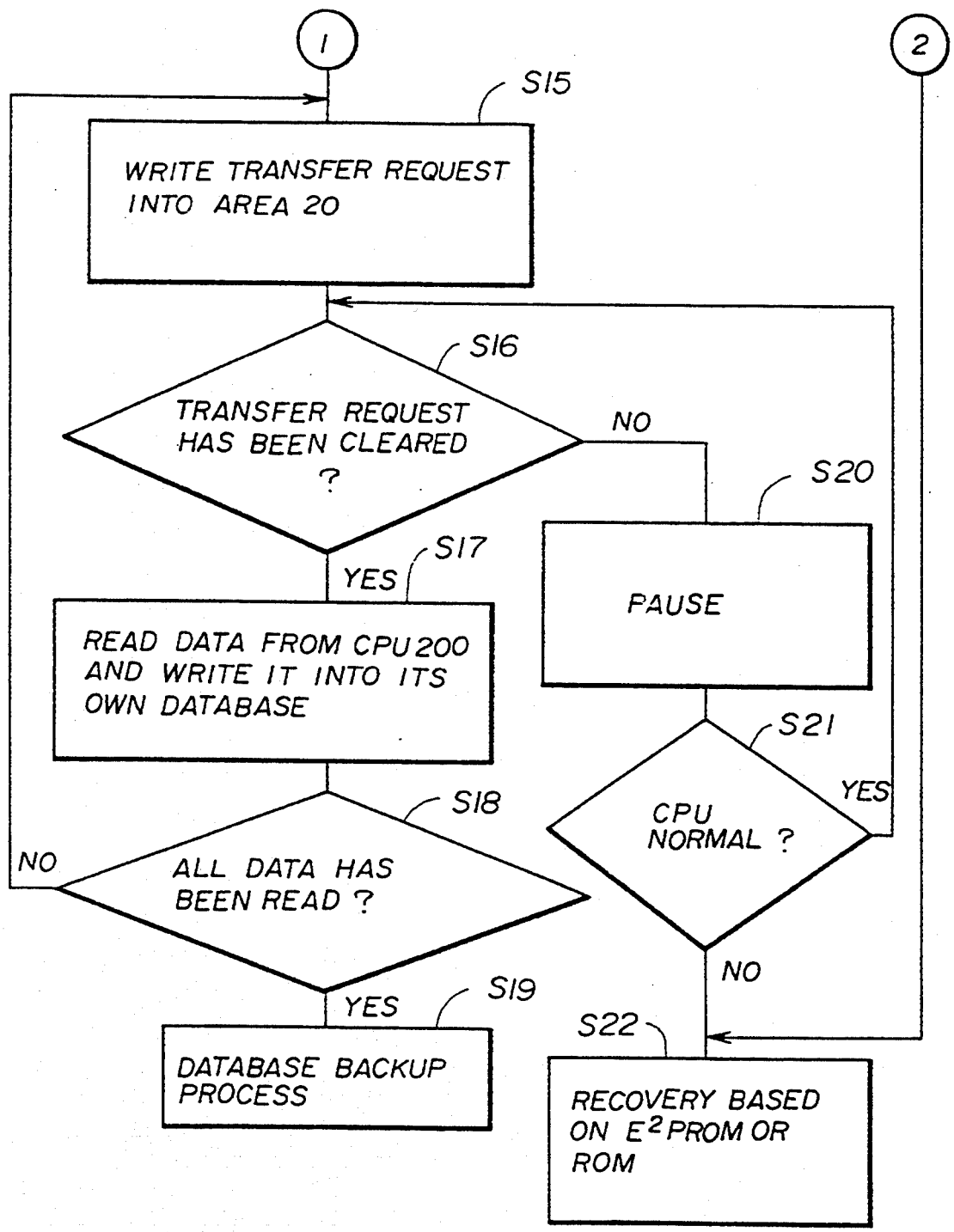
Figure 6:
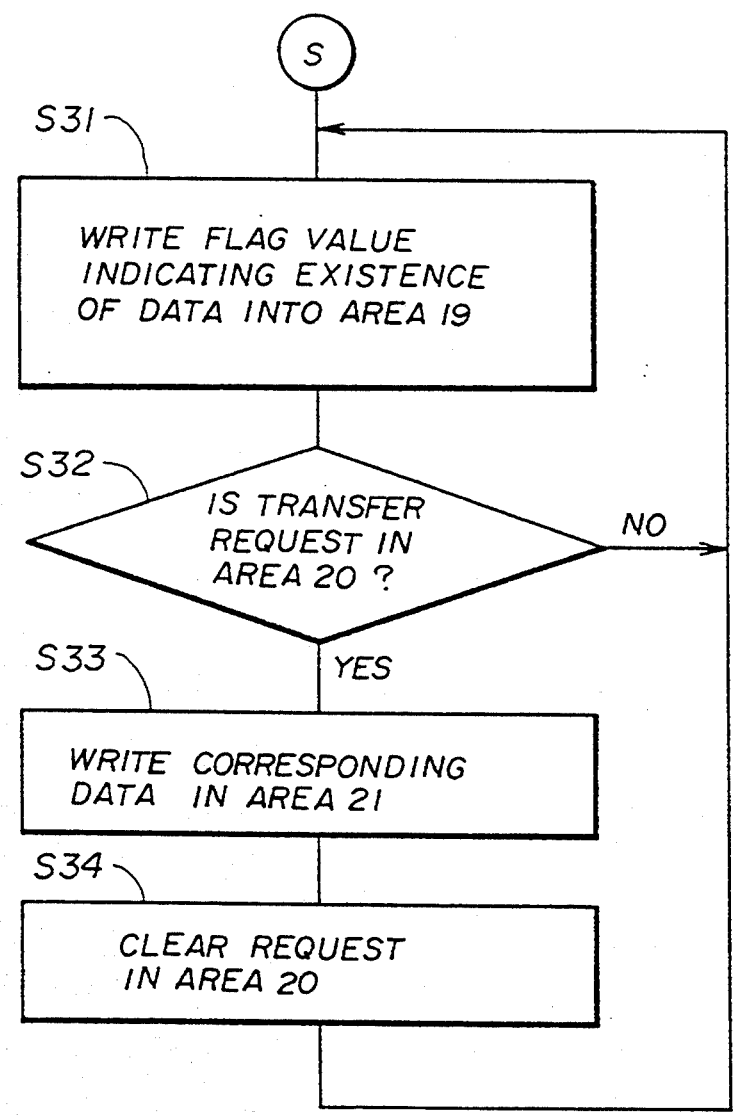
FIG. 6 is a flowchart showing the operation of a second CPU used in the embodiment of the present invention.
Figure 7:
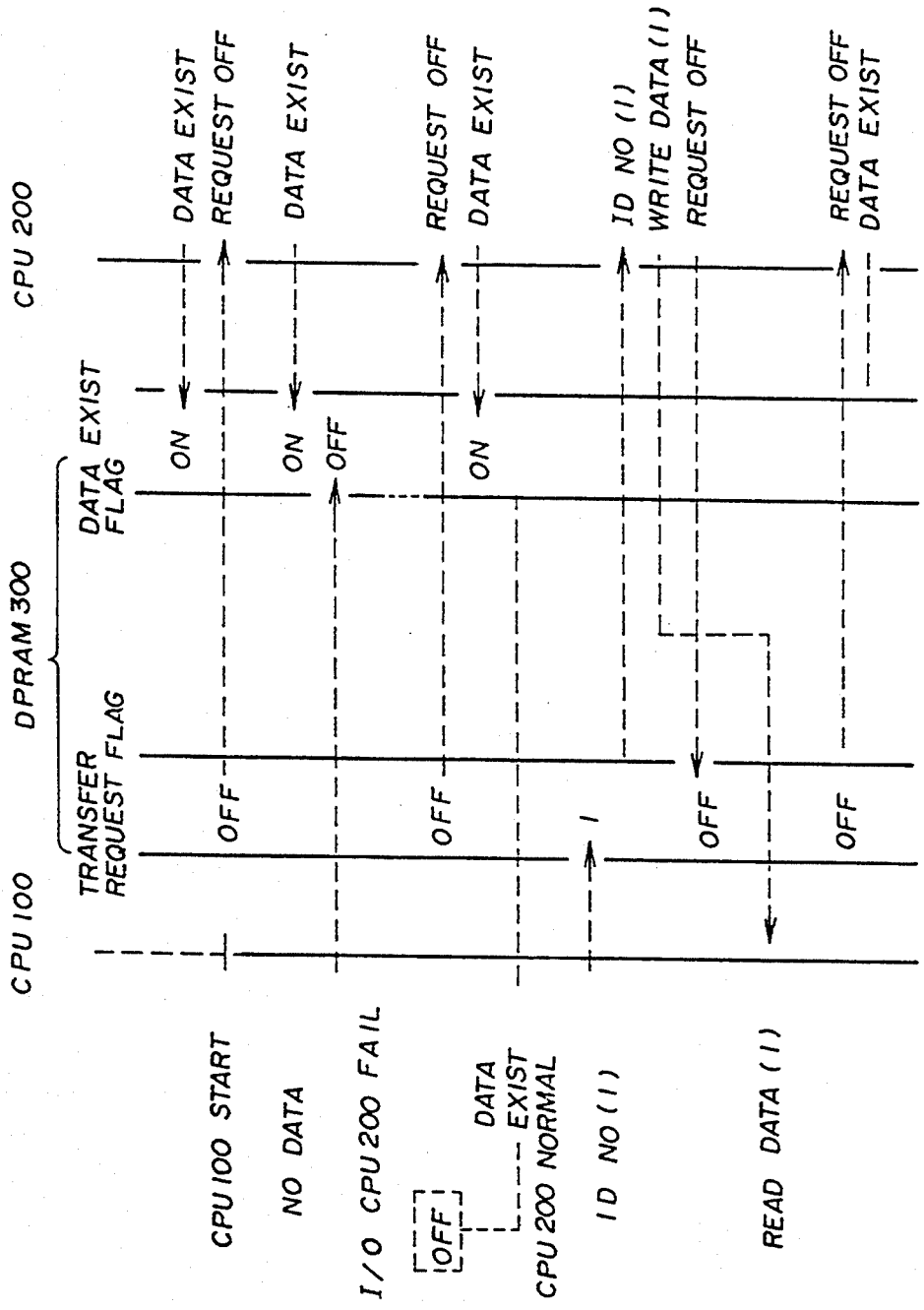
FIG. 7 is a timing chart showing the operation of the embodiment of the present invention.

FIGS. 5A and 5B are flowcharts showing the operation of the CPU 100 executed when the CPU 100 commences to operate. FIG. 6 is a flowchart showing the normal operation of the CPU 200. FIG. 7 is a timing chart showing a sequence of operations of the CPUs 100 and 200. More particularly, FIG. 7 shows an operation in which a failure occurs in the CPU 100 and is then eliminated. In FIG. 4, (1)–(11) indicate steps of the operation of the system shown therein.

The CPU 200 writes data into the database 32, and then periodically (every 70 ms, for example) writes the flag value 0 (or 00H)" (indicating the existence of data) into the flag area 19 (step (1) in FIG. 4, step S31 in FIG. 6). The CPU 100 periodically refers to the failure detecting unit 17 (FIG. 4), and determines whether or not the CPU 200 is normally operating (step S11 in FIG. 5A). Then, the CPU 100 writes the flag data "1" (indicating the non-existence of data) into the flag area 19 in order to determine whether or not the CPU 200 has data (step (2) in FIG. 4, step S12 in FIG. 5A).

The CPU 100 is shifted to a pause mode having a predetermined period of time equal to, for example, 30 ms, in order to wait for the completion of the writing of data into the data area 21 by the CPU 200 (step S13 in FIG. 5A). Then, the CPU 100 refers to the failure detecting unit 17 and the flag area 19 in the DPRAM 300, and determines whether or not data from the CPU 200 can be recovered (step (3) in FIG. 4, step S14 in FIG. 5A). It is preferable to repeatedly perform step S14 a predetermined number of times (twice for example) with a predetermined pause between each time (30 ms, for example). In the case being considered, the CPU 200 is normally operating, and the flag value in the flag area 19 is "0" (indicating the existence of data). Hence, the CPU 100 concludes that data can be recovered on the basis of the data in the CPU 200.

The CPU 100 writes the data identification number assigned to the data block into the flag area 20 (step (4) in FIG. 4, step S15 in FIG. 5B). In the example shown in FIG. 4, the data identification number indicating data block 1 is sent to the flag area 20. The CPU 200 periodically (every 70 ms, for example) monitors the data transfer request flag area 20, and detects the data identification number written therein (step (5) in FIG. 4, step S32 in FIG. 6). Then, the CPU 200 writes the data block 1 specified by the data identification number into the data area 21 of the DPRAM 300 (step (6) in FIG. 4, step S33 in FIG. 6). The CPU 200 clears the contents of the flag area 20 after the writing of the data block 1 into the data area 21 is completed (step (7) in FIG. 4, step S34). The steps S31–S34 are repeatedly carried out.

The CPU 100 periodically (every 70 ms, for example) monitors the flag area 20 and detects that the writing of the data block into the data area 21 from the CPU 200 has been completed (step (8) in FIG. 4, steps S16, S17, S18 in FIG. 5B). Step S21 is executed after a predetermined pause time (step S20) from the decision of step S16. The pause time is provided in order to wait for the completion of the writing of the data transfer request from the CPU 200. At step S21, the CPU 200 determines whether or not the CPU 200 is normally operating. When the result of this determination is affirmative, the CPU 100 executes step S16. When the result of the above determination is negative, the CPU 100 executes step S22 in which the database 31 is recovered on the basis of the backup data in the E²PROM 500 or the default data in the ROM 400.

The CPU 100 reads the data block 1 from the data area 21 (step (9) in FIG. 4, step S17 in FIG. 5B). The CPU 100 repeatedly performs the steps (4)–(8) (steps S15–S17) by updating the data identification number until all data blocks have been received (step (19) in FIG. 4, step S18 in FIG. 5B). In the example being considered, data blocks 1 and 2 are transferred from the CPU 200 to the CPU 100. The CPU 100 compares the default data read from the ROM 4 with the received data in the decision unit 24. When it is determined that the default data does not coincide with the received data, the received data is effective data and is saved in the E²PROM 500 as backup data (step (11) in FIG. 4, step S19 in FIG. 5B). In the example shown in FIG. 4, the data blocks 1 and 2 are received, while the ROM 400 stores blocks 1 and 3. Hence, the data block 2 is saved in the E²PROM 500.

Figure 8:
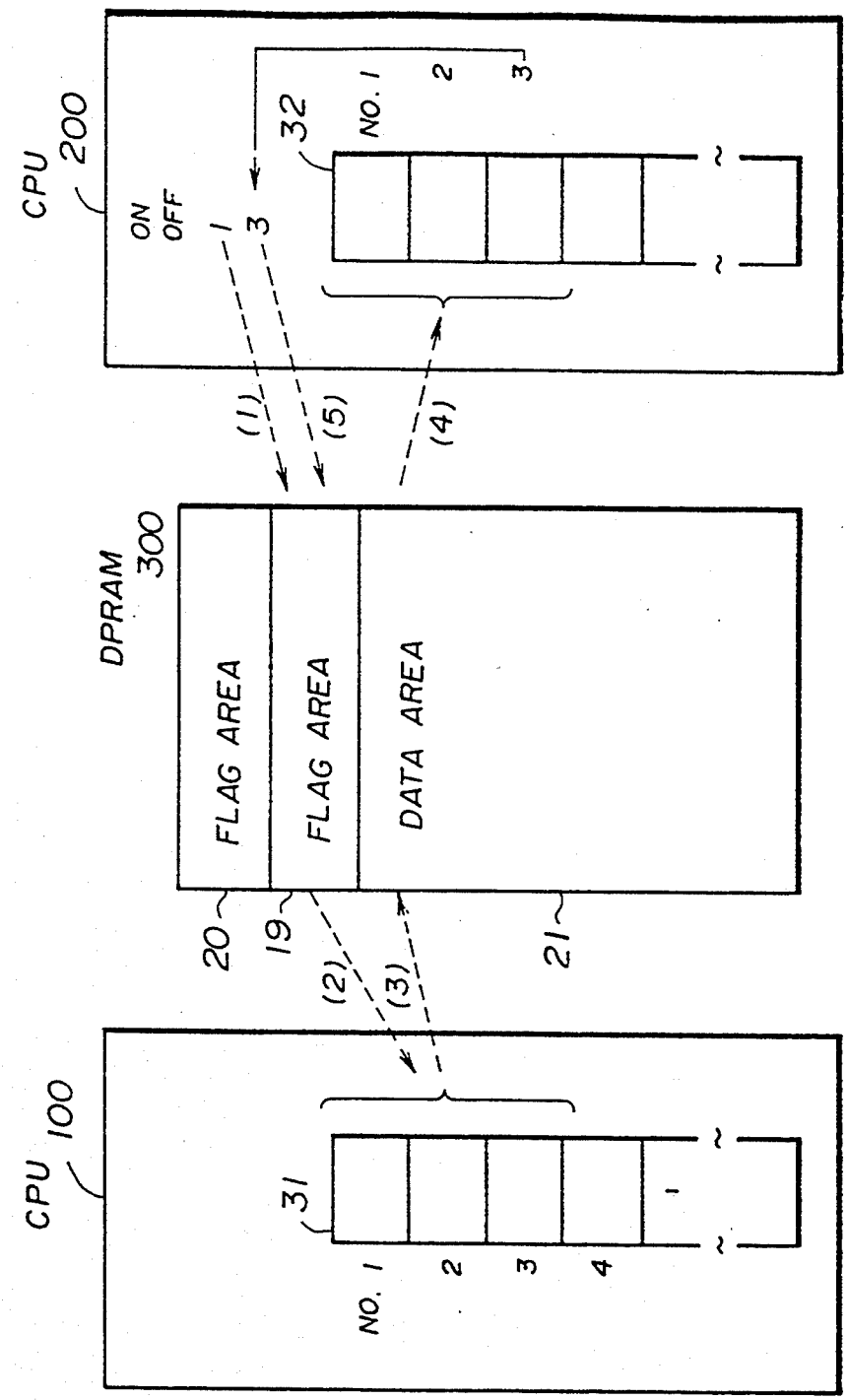
FIG. 8 is a block diagram showing the operation of the embodiment of the present invention.
Figure 9:
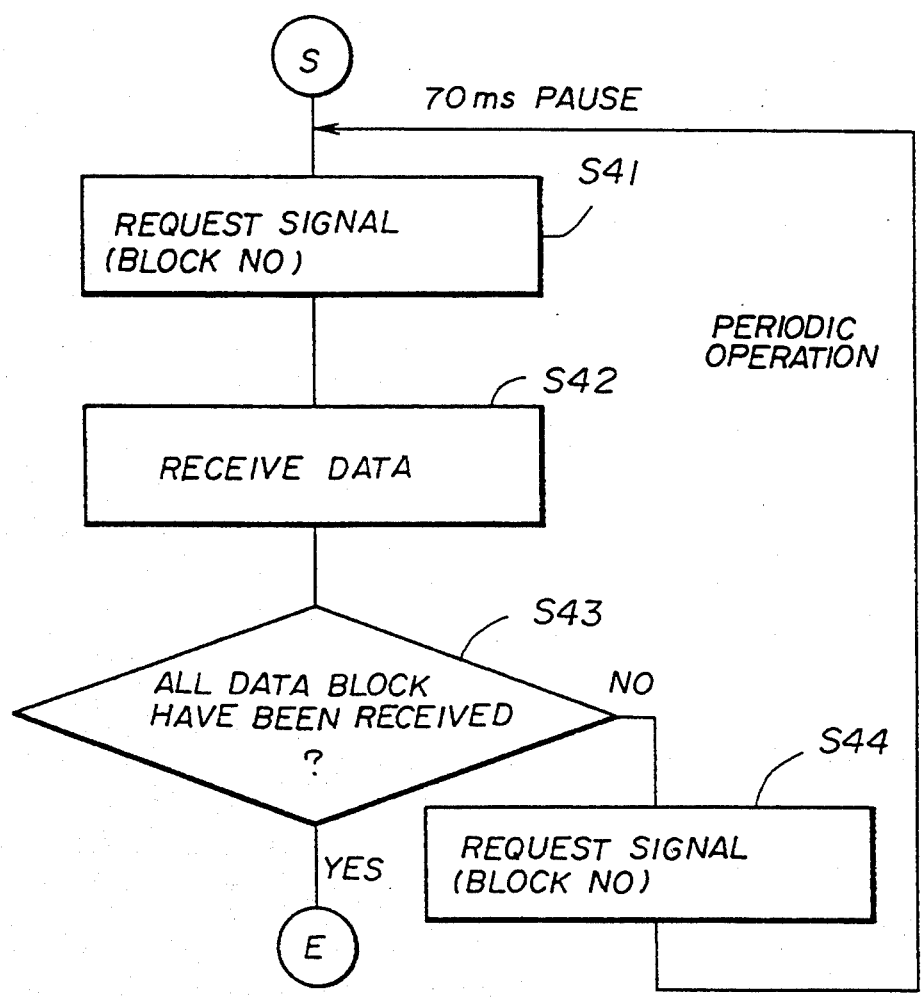
FIG. 9 is a flowchart showing the operation of the second CPU used in the embodiment of the present invention.
Figure 10A:
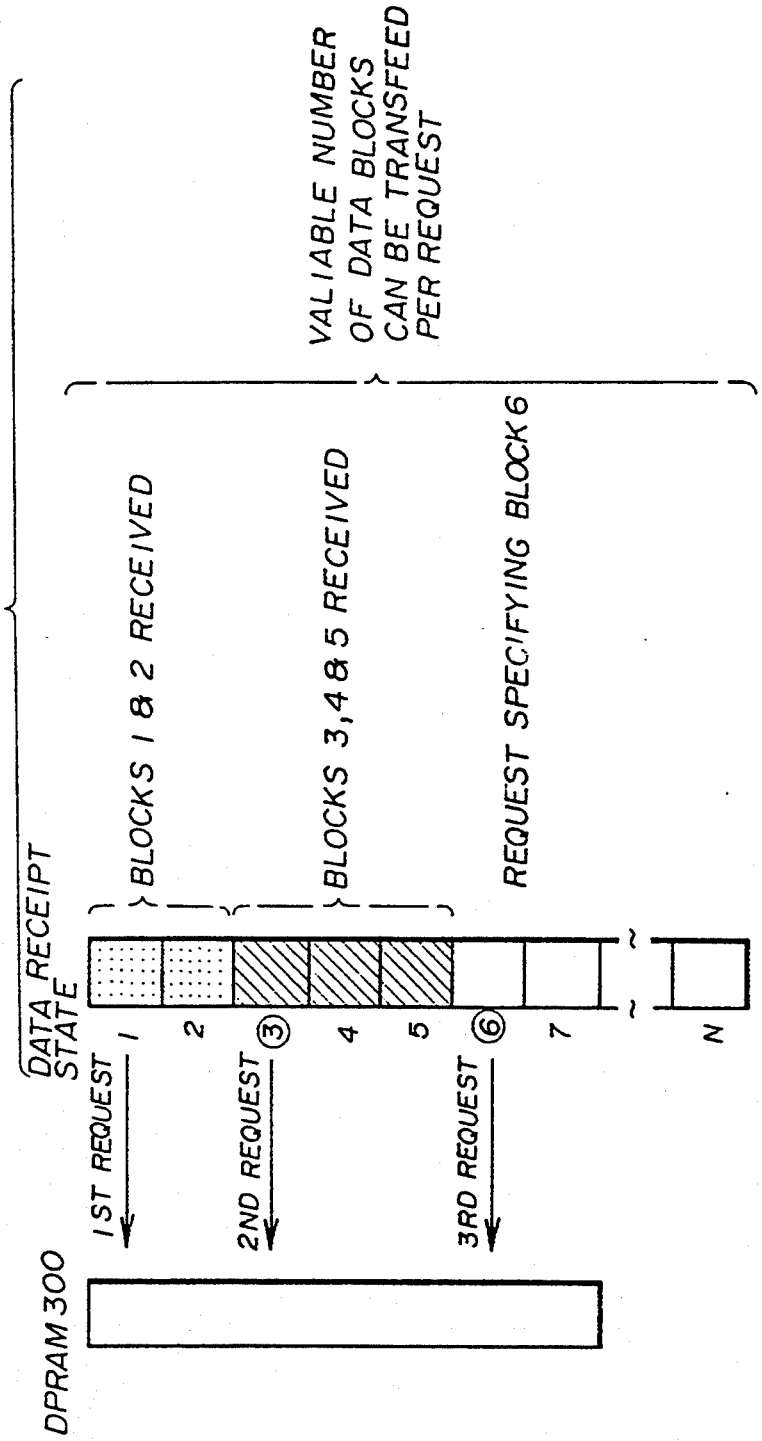

A description will now be given, with reference to FIGS. 8 through 10B, of an operation of the system executed when the database 32 of the CPU 200 is recovered. FIG. 8 shows a sequence for recovering the database 32 of the CPU 200, and FIG. 9 is a flowchart of the operation of the CPU 200. FIGS. 10A and 10B are diagrams showing a sequence in which the CPU 200 receives data from the DPRAM 300.

The CPU 200 periodically (every 70 ms, for example) accesses the DPRAM 300, and issues a data transfer request signal indicating the first data block to be transferred. The CPU 100 sequentially transfers a plurality of data blocks at a time. The CPU 200 manages up to which data block have been received, and issues the data transfer request signal indicating the data block from which data transfer is requested. If the CPU 200 fails to receive some data, the CPU 200 requests the CPU 100 to transfer data blocks starting from the corresponding block. When the CPU 200 has received all of the requested data blocks, it writes the flag value indicating the existence of data into the flag area 19 via the periodic process.

More specifically, the CPU 200 writes the data transfer request signal indicating the first data block labeled 1 into the flag area 19 (step (1) in FIG. 8, step S41 in FIG. 9). The CPU 100 reads the data transfer request signal from the flag area 19 and identifies the first data block from which a plurality of data blocks should be sequentially transferred (step (2) in FIG. 8). The CPU 100 writes as many data blocks as possible starting from the specified data block into the data area 21 of the DPRAM 300 (step (3) in FIG. 8).

The CPU 200 reads the data blocks from the data area 21 of the DPRAM 300 (step (4) in FIG. 8, step S42 in FIG. 9). Then, the CPU 200 determines whether or not all of the requested data blocks have been received (step S43 in FIG. 9). When the result of this determination is negative, the CPU 200 sends the data transfer request signal indicating the data block from which subsequent data blocks are sequentially transferred (step S44). When all the data blocks have been received, the CPU 200 changes the flag in the flag area 19 from "1" to "0".

In the example shown in FIG. 10A, data blocks 1 and 2 have been received, and hence the CPU 200 specifies data block 3 in the data transfer request signal. In the example shown in FIG. 10A, data blocks 3, 4 and 5 are consecutively received. In the above-mentioned manner, the steps S41–S44 are repeatedly carried out until all of the requested data blocks have been received. It will be noted that an arbitrary number of data blocks can be successively transferred in response to the data transfer request signal from the CPU 200.

In the example shown in FIG. 10B, data blocks 1–4 are consecutively transferred from the CPU 100 to the CPU 200 in response to the first data transfer request signal. The CPU 200 fails to completely receive data block 5, and hence generates the second data transfer request signal specifying the data block 5. In response to the second request, only data block 5 is received by the CPU 200. Hence, the CPU 200 generates the third data transfer request signal specifying the data block 6.

Figure 11:
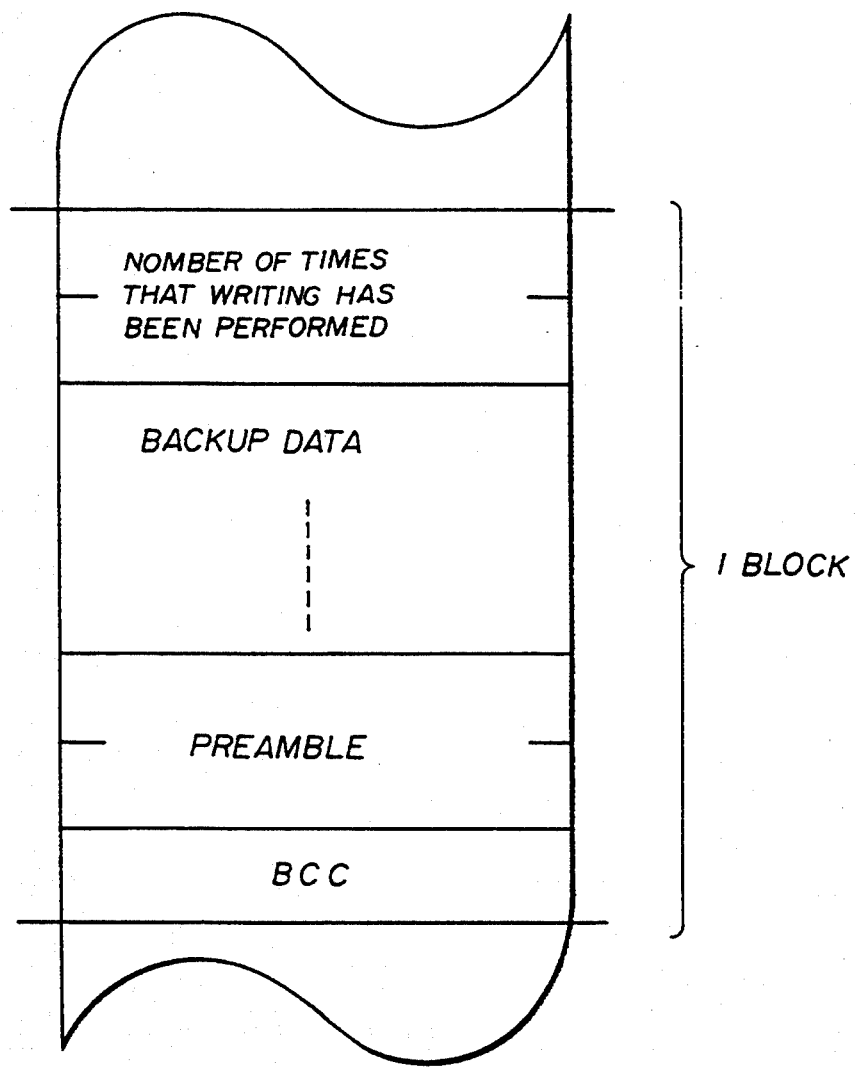
FIG. 11 is a diagram showing the structure of an E$^2$PROM used in the embodiment of the present invention.
Figure 12A:
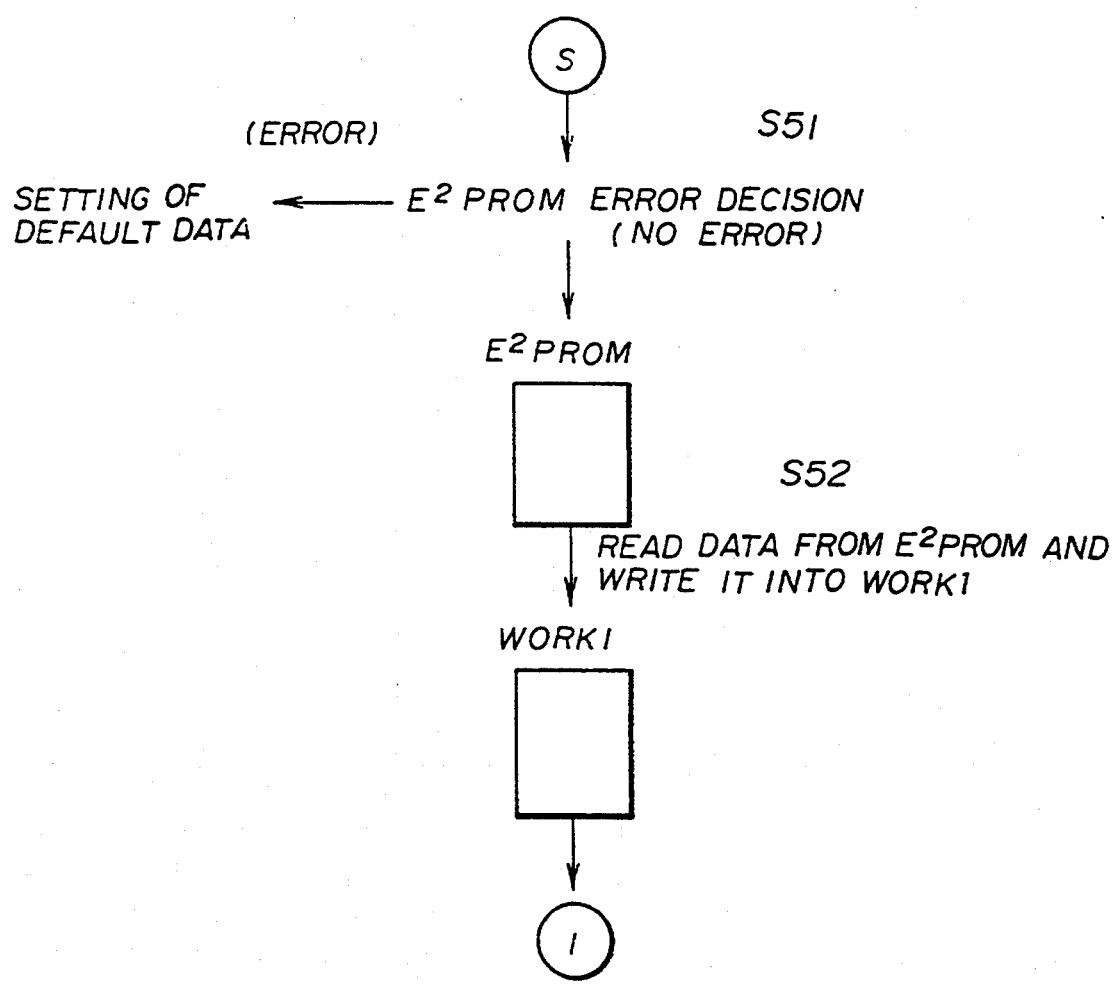
FIGS. 12A and 12B are diagrams showing the operation of an E$^2$PROM status decision unit used in the embodiment of the present invention.
Figure 12B:
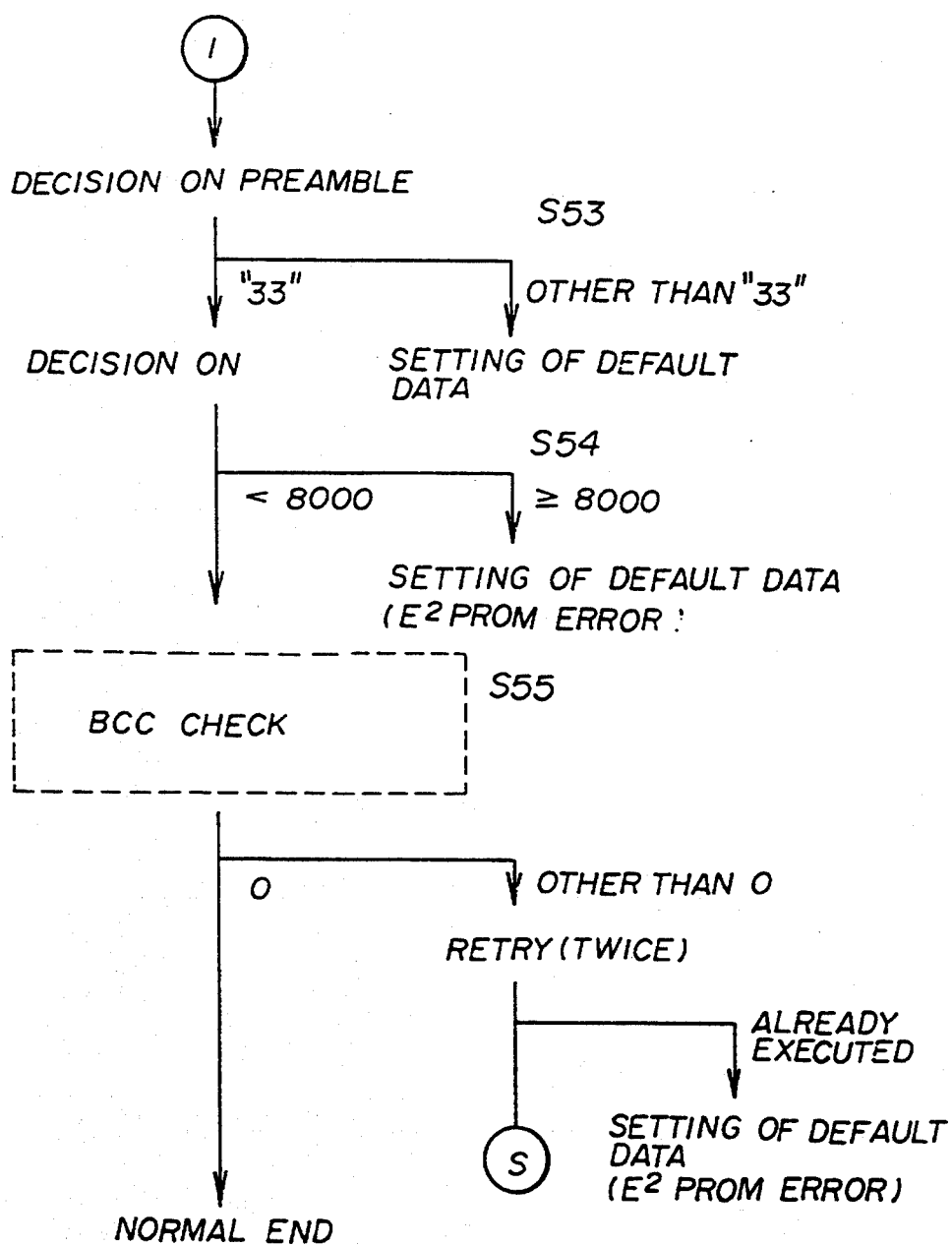

A description will now be given, with reference to FIGS. 11, 12A and 12B, of the operation of the system executed when data recovery is performed using the data stored in the E²PROM 500. FIG. 11 shows the structure of the E²PROM 500, and FIGS. 12A and 12B show the operation executed when data recovery is performed using the data stored in the E²PROM 500.

When data recovery based on the data holding unit 15 (database 31) cannot be executed, the E²PROM status decision unit 25 (FIG. 3) determines whether or not data recovery based on the E²PROM 500 can be executed. When the result of this determination is affirmative, the data stored in the E²PROM 500 can be transferred to the database 31. The determination as to whether or not data recovery based on the E²PROM 500 can be performed refers to the number of times that the writing operation on each storage block in the E²PROM 500 have been repeatedly carried out, the preamble data related to the storage areas in the E²PROM 500, and the BCC code data.

Normally, the E²PROMS have a limited number of times that the writing (programming) operation can be repeatedly performed. If the writing operation of the E²PROM 500 has been performed a number of times in excess of the limited number, the accuracy of data from the E²PROM 500 cannot be ensured. The CPU 100 includes a software counter which counts the number of times.

The preamble data indicates the status of each divided storage block in the E²PROM 500. The status shows that the storage block is normal, virgin or abnormal. The BCC code data corresponds to the result of an exclusive-OR operation on data to be written and additional data. When data is read from the E²PROM 500, the exclusive-OR operation on the read data is performed, and the result thereof is and compared with the result stored in the E²PROM 500. When both the results coincide with each other, it is determined that the read data is correct.

FIG. 11 shows one storage block in the E²PROM 500. As shown in FIG. 11, each storage block includes data indicating the number of times that the writing operation has been repeatedly carried out, backup data, the preamble data and the BCC code data. For example, when the number of times indicates zero, no backup data is stored in the storage block, which cannot be used.

When the number of times is between 1 and 7999, backup data is stored in the block. When the number of times exceeds 8000, the writing operation on the block has been performed in excess of the allowable number. Hence, this block cannot be used.

When the preamble data indicates a predetermined number, for example, "33", the corresponding block can be used. When the preamble data indicates a number other than "33", the corresponding block cannot be used. The BCC code data is obtained by performing an exclusive-OR operation on the data indicating the number of times, the backup data and the preamble. When the result of the exclusive-OR operation on the readout data is '0', the data stored in the storage block is correct. When the result indicates a value other than '0', the data is erroneous.

Referring to FIG. 12A, the decision unit 25 determines whether or not the entire E²PROM 500 is inhibited from being used due to a certain cause (step S51). When it is determined that the E²PROM 500 can be used, backup data is read from the E²PROM 500 and written into a work area WORK1 in the decision unit 25 (step S52). Step S51 will be described later. The decision unit 25 refers to the preamble data related to the data block in the work area WORK1, and determines whether or not the preamble data indicates the predetermined value ("33" for example) (step S53). When the result of this determination is negative, the default data is read from the ROM 400. When the result of the above determination is affirmative, the decision unit 25 refers to the number of times that the writing operation has been repeatedly carried out (step S54). When the decision unit 25 determines that the data recovery based on the E²PROM 500 cannot be performed, the default data is read from the ROM 400. When the decision unit 25 determines that the data recovery based on the E²-PROM 500 can be performed, the decision unit 25 executes the exclusive-OR operation on the readout data (step S55). When the result of the above operation indicates '0', the decision unit 25 determines that the backup data being considered is correct, and writes the backup data into the data holding unit 15 (database 31). When the result of the operation indicates a number other than '0', step S51 is carried out again. Then, the steps S52–S55 are carried out again. When the result of the operation at step S55 is negative, the steps S51–S55 are carried again. When the result of the operation at step S55 is still negative, the default data is read from the ROM 400.

As described in the foregoing, one of the CPUs is recovered from the failure state by using data held in the data holding unit (database) in the other CPU. Data different from the default data is stored in the E²PROM connected to one of the CPUs. When all the CPUs are recovered from the failure states, backup data is read from the E²PROM if usable. Hence, it does not take a long time to restart the system.

The present invention is not limited to the specifically disclosed embodiment, and variations and modifications may be made without departing from the scope of the present invention.

What is claimed is:

1. A data management system for CPUS coupled to each other, comprising:
    a first processing unit;
    a second processing unit operating independently of the first processing unit;
    a dual-port memory connected between the first processing unit and the second processing unit and used to transfer data between the first processing unit and the second processing unit;
    first data holding means, related to the first processing unit, for storing data used for processing in the first processing unit;
    second data holding means, related to the second processing unit, for storing data used for processing in the second processing unit;
    control means coupled to the first and second processing units, to the dual-port memory and to the first and second data holding means, for transferring data stored in one of the first and second data holding means to the other one of the first and second data holding means via said dual-port memory, said data being transferred when a failure occurs in one of the first and second processing units and said failure has been eliminated, said first and second holding means storing identical data after said data transfer; and
    means in said first processing unit for detecting a failure in said second processing unit and means in said second processing unit for detecting a failure in said first processing unit.

2. The data management system as claimed in claim 1, further comprising:
    a first memory storing default data used in processing in the first and second processing units;
    a second memory storing backup data selectively transferred from the first data holding means; and
    first decision means, coupled to the first memory and the second memory, for determining, when failures occur in both the first and second processing units and said failures have been eliminated, whether the first memory or the second memory should be selected, on the basis of a status of the second memory, and for transferring either the default data or the backup data to the first and second data holding means.

3. The data management system as claimed in claim 2, wherein said first decision means comprises means for determining whether or not the backup data really exists in the second memory and is correct and for selecting the second memory when it is determined that the backup data really exists in the second memory and is correct.

4. The data management system as claimed in claim 2, wherein:
    the second memory comprises a programmable read only memory; and
    said first decision means comprises means for determining whether or not a writing operation on the second memory has been performed in excess of an allowable number of times that the writing operation can be repeatedly carried out and for selecting the second memory when it is determined that the writing operation has been performed less than the allowable number of times.

5. The data management system as claimed in claim 2, wherein said first decision means comprises means for determining whether or not the second memory is normal by referring to information stored in the second memory and for selecting the second memory when it is determined that the second memory is normal.

6. The data management system as claimed in claim 2, wherein said first decision means comprises means for determining whether or not the backup data read from the second memory coincides with the backup data stored therein and for selecting the second memory when it is determined that the backup data read from the second memory coincides with the backup data stored therein.

7. The data management system as claimed in claim 2, wherein:
    the second memory comprises a programmable read only memory; and
    said first decision means comprises:
        first means for determining whether or not a writing operation on the second memory has been performed in excess of an allowable number of times that the writing operation can be repeatedly carried out;
        second means for determining whether or not the second memory is normal by referring to information stored in the second memory;
        third means for determining whether or not the backup data read from the second memory coincides with the backup data stored therein; and
        fourth means for selecting the second memory when it is determined that the writing operation has been performed less than the allowable number of times and the second memory is normal and that the backup data read from the second memory coincides with the backup data stored therein.

8. The data management system as claimed in claim 2, further comprising second decision means for determining whether or not the data stored in the first data holding means coincides with the default data stored in the first memory and for writing the data stored in the first data holding means into the second memory when it is determined that the data stored in the first data holding means does not coincide with the default data.

9. The data management system as claimed in claim 1, wherein:
the first processing unit comprises means for periodically writing first flag information into the dual-port memory, said first flag information indicating whether or not the first data holding means really stores data;
the second processing unit comprises means for periodically writing second flag information into the dual-port memory, said second flag information indicating whether or not the second data holding means really stores data;
the control means comprises first means, provided in the first processing unit, for determining, when a failure occurs in the first processing unit and is eliminated, whether or not the second data holding means really holds data by referring to the second flag information; and
the control means comprises second means, provided in the second processing unit, for determining, when a failure occurs in the second processing unit and is eliminated, whether or not the first data holding means really holds data by referring to the first flag information.

10. The data management system as claimed in claim 1, wherein:
the first processing unit comprises means for writing first request information into the dual-port memory, said first request information specifying data to be transferred from the second data holding means;
the second processing unit comprises means for writing second request information into the dual-port memory, said second request information specifying data to be transferred from the first data holding means;
the control means comprises first means, provided in the first processing unit, for determining data to be transferred to the second processing unit via the dual-port memory by referring to the second request information; and
the control means comprises second means, provided in the second processing unit, for determining data to be transferred to the first processing unit via the dual-port memory by referring to the first request information.

11. The data management system as claimed in claim 3, further comprising second decision means for determining whether or not the data stored in the first data holding means coincides with the default data stored in the first memory and for writing the data stored in the first data holding means into the second memory when it is determined that the data stored in the first data holding means does not coincide with the default data.

12. The data management system as claimed in claim 4, further comprising second decision means for determining whether or not the data stored in the first data holding means coincides with the default data stored in the first memory and for writing the data stored in the first data holding means into the second memory when it is determined that the data stored in the first data holding means does not coincide with the default data.

13. The data management system as claimed in claim 5, further comprising second decision means for determining whether or not the data stored in the first data holding means coincides with the default data stored in the first memory and for writing the data stored in the first data holding means into the second memory when it is determined that the data stored in the first data holding means does not coincide with the default data.

14. The data management system as claimed in claim 6, further comprising second decision means for determining whether or not the data stored in the first data holding means coincides with the default data stored in the first memory and for writing the data stored in the first data holding means into the second memory when it is determined that the data stored in the first data holding means does not coincide with the default data.

15. The data management system as claimed in claim 7, further comprising second decision means for determining whether or not the data stored in the first data holding means coincides with the default data stored in the first memory and for writing the data stored in the first data holding means into the second memory when it is determined that the data stored in the first data holding means does not coincide with the default data.

16. The data management system as claimed in claim 2, wherein said second memory comprises an electrically erasable programmable read only memory.

17. The data management system as claimed in claim 2, wherein said first memory comprises a nonvolatile memory.

18. A data management system for CPUS coupled to each other, comprising:
a first processing unit;
a second processing unit operating independently of the first processing unit;
a dual-port memory connected between said first processing unit and said second processing unit and used to transfer data between said first processing unit and the second processing unit;
first data holding means, related to said first processing unit, for storing data used for processing in said first processing unit;
second data holding means, related to said second processing unit, for storing data used for processing in said second processing unit;
control means, coupled to said first and second processing units, to said dual-port memory and to said first and second data holding means, for transferring said data stored in one of said first and second data holding means to the other one of said first and second data holding means via said dual-port memory when a failure occurs in the other one of said first and second processing units and said failure has been eliminated, said first and second holding means storing identical data after said data transfer;
a first memory storing default data used in processing in said first and second processing units;
a second memory storing backup data selectively transferred from said first data holding means; and
first decision means, coupled to said first memory and said second memory, for determining, when failures occur in both said first and second processing units and have been eliminated, whether said first memory or said second memory should be selected, on the basis of a status of said second memory, and for transferring either the default data or the backup data to said first and second data holding means from one of said first and second memories, said memory being selected for said data transfer so that said first and second holding means store identical data.

* * * * *